B. T. O'BRIEN & W. H. BROWNING.
MACHINE FOR CALCULATING.
APPLICATION FILED JAN. 31, 1905.

975,633.

Patented Nov. 15, 1910.
7 SHEETS—SHEET 1.

FIG. 1.

WITNESSES.

INVENTORS.

FIG. 2.

B. T. O'BRIEN & W. H. BROWNING.
MACHINE FOR CALCULATING.
APPLICATION FILED JAN. 31, 1905.

975,633.

Patented Nov. 15, 1910.

WITNESSES.
E. Howard
Joseph Bates

INVENTORS.
B. T. O'Brien
W. H. Browning
by O'Brien O'Brien
atty

B. T. O'BRIEN & W. H. BROWNING.
MACHINE FOR CALCULATING.
APPLICATION FILED JAN. 31, 1905.

975,633.

Patented Nov. 15, 1910.

WITNESSES.
E. Howard
Joseph Bates

INVENTORS.
B. T. O'Brien
W. H. Browning

B. T. O'BRIEN & W. H. BROWNING.
MACHINE FOR CALCULATING.
APPLICATION FILED JAN. 31, 1905.

975,633.

Patented Nov. 15, 1910.
7 SHEETS—SHEET 5.

WITNESSES.
E. Howard
Joseph Bates

INVENTORS.
B. T. O'Brien
W. H. Browning
by J. O'B...
atty.

B. T. O'BRIEN & W. H. BROWNING.
MACHINE FOR CALCULATING.
APPLICATION FILED JAN. 31, 1905.

975,633.

Patented Nov. 15, 1910.
7 SHEETS—SHEET 6.

WITNESSES.
E. Howard
Joseph Bates

INVENTORS.
B. T. O'Brien
W. H. Browning
by J. Waren O'Brien
atty

B. T. O'BRIEN & W. H. BROWNING.
MACHINE FOR CALCULATING.
APPLICATION FILED JAN. 31, 1905.

975,633.

Patented Nov. 15, 1910.
7 SHEETS—SHEET 7.

FIG. 21.

WITNESSES.
E. Howard
Joseph Bates

INVENTORS.
B. T. O'Brien
W. H. Browning
by O. J. O'Brien
atty

UNITED STATES PATENT OFFICE.

BENJAMIN THOMPSON O'BRIEN AND WALTER HENRY BROWNING, OF LIVERPOOL, ENGLAND; SAID BROWNING ASSIGNOR TO SAID O'BRIEN.

MACHINE FOR CALCULATING.

975,633.    Specification of Letters Patent.    Patented Nov. 15, 1910.

Application filed January 31, 1905.    Serial No. 243,579.

*To all whom it may concern:*

Be it known that we, BENJAMIN THOMPSON O'BRIEN and WALTER HENRY BROWNING, British subjects, and residents both of Liverpool, in the county of Lancaster, England, have invented certain new and useful Improvements in Machines for Calculating, of which the following is a specification.

This invention relates to improvements in apparatus for adding or counting without the use of rotating wheels, and may be employed in conjunction with a cash drawer or otherwise as a cash registering apparatus or it may be employed simply as an adding machine either with or without registering or recording apparatus.

Fig. 12, plan in detail of counting mechanism showing one bolt set for carrying on.

The counting is effected by a number of counting plates A and A' which are mounted to slide vertically the plates A being raised a given distance for each unit and allowed to fall when 10, 12 or other desired number of units have been added and the plates A' being raised one unit to represent tens, hundreds, pounds or other denominations.

In its simplest form the machine is constructed with sliding plates to represent tens, hundreds, thousands and so on or it may with slight modification or arrangement be constructed so that the plates represent pence, shillings, pounds, dollars, marks, francs or other denomination of money or weights. In whichever form it is constructed the sliding plates are all constructed and operated in a similar manner so that in describing the machine it is only necessary to describe the action of one or two plates the succeeding ones to any extent being merely reproductions thereof differing only according to the denomination which they are intended to represent, one set is shown detached in Fig. 2.

Each counting plate A is provided with a number of holes $a$ and is raised by the crosshead B, provided with lifting pins $b$ which enter the holes $a$. The cross head B is lifted by a lever D operated or controlled by a key C of which there is one for each unit or value of each denomination. The lever D lifts the cross head B and pin $b$ after the latter has entered the hole $a$, the hole $a$ being placed over the pin $b$ by the swinging action of the frame 110 operated by the hand lever C and the link $h'$. The depressing of the key liberates the lever D which at its forward end moves forward operated by the action of a weight or spring and the back end $d'$ is raised a corresponding distance and elevates the crosshead B.

The counting plates A are mounted to slide vertically or approximately vertically in a swinging frame 110 pivoted on a fixed shaft $110^a$ in front of the frame 111, which is also pivoted on shaft $110^a$ and in the frame 111 the cross heads B slide vertically. The operating frame D is pivoted on any stationary part of the framework of the machine and the keys C are pivoted on rods E.

Figure 1:
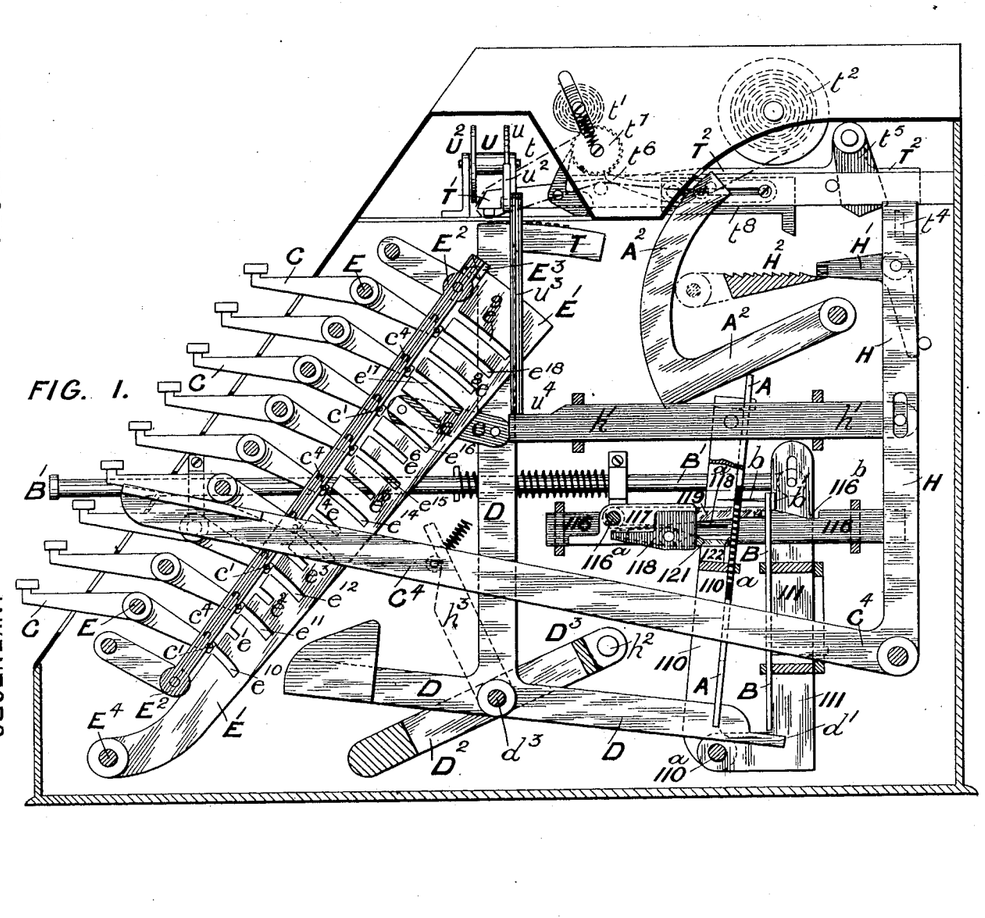
Figure 1, side elevation.
Figure 2:
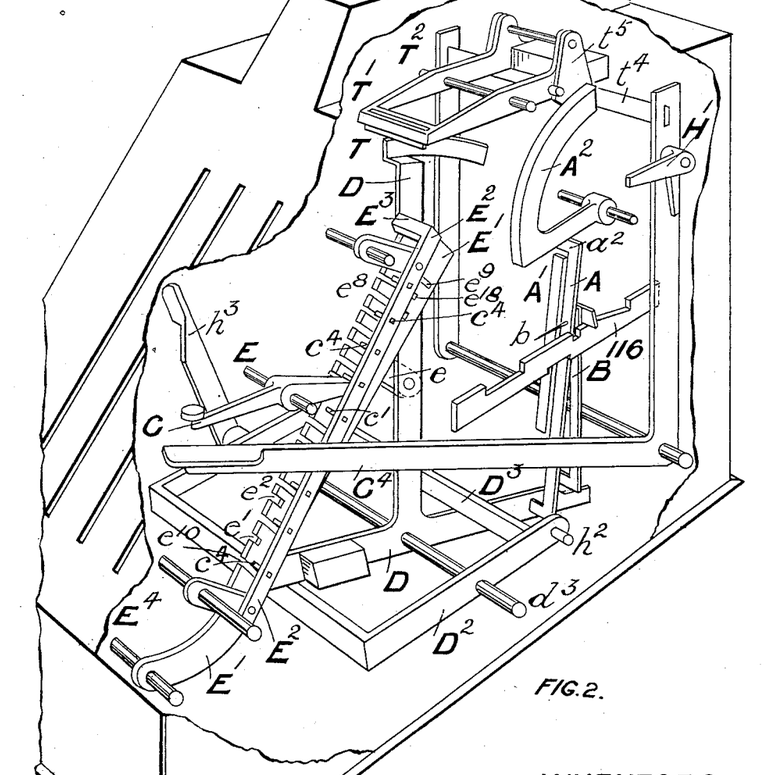
Fig. 2, perspective view.
Figure 3:
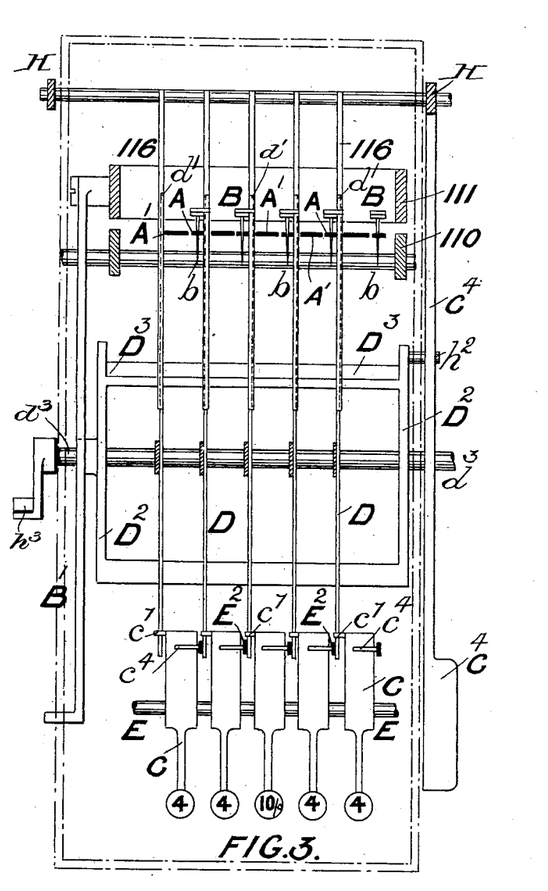
Fig. 3, plan of machine on line z—z of Fig. 1.
Figure 4:
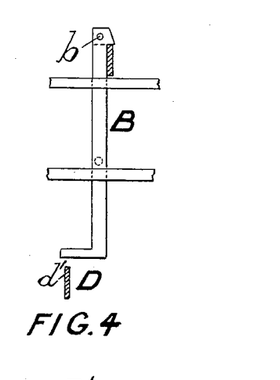
Fig. 4, front elevation of lifting crosshead.
Figure 5:
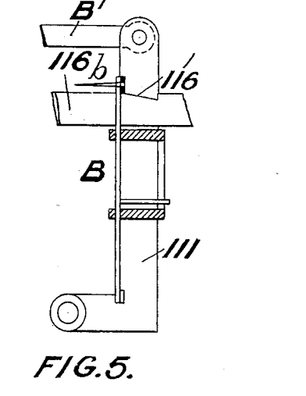
Fig. 5, side elevation of lifting cross head.
Figure 6:
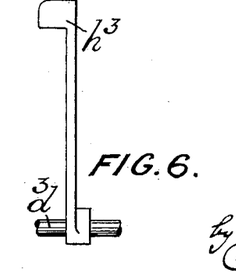
Fig. 6, front elevation of handle attached to resetting lever for the purpose of correcting errors in striking down.
Figures 7, 9:
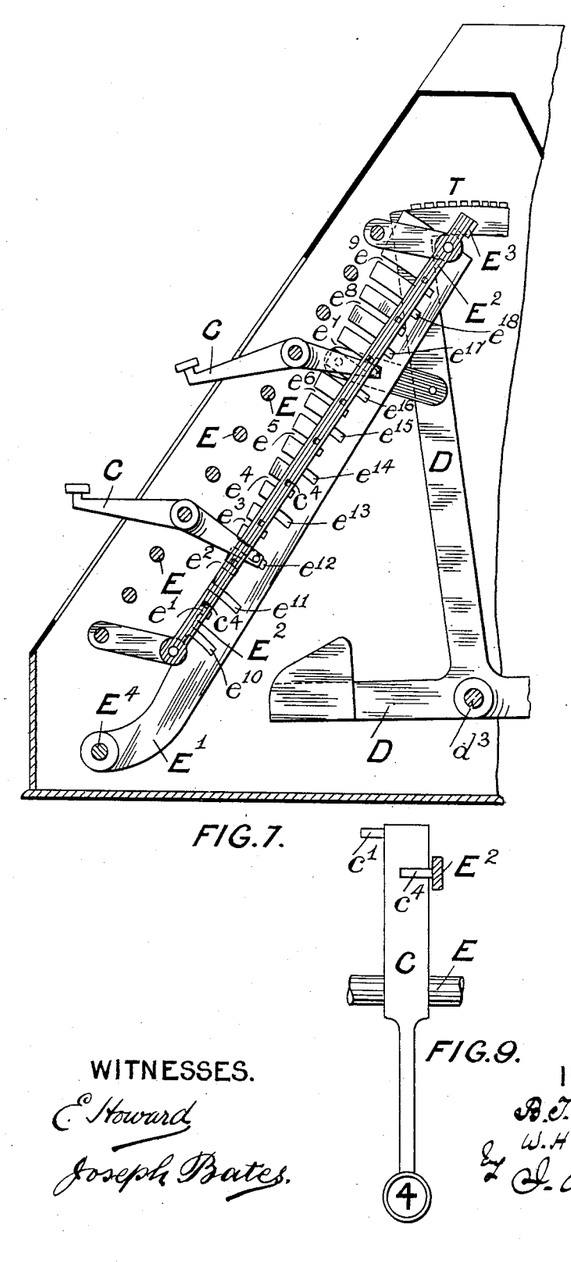
Fig. 7, side elevation of key action and lever engaging with keys, showing one key depressed.
Fig. 9, plan of key enlarged showing connection with lever locking bar.
Figure 8:
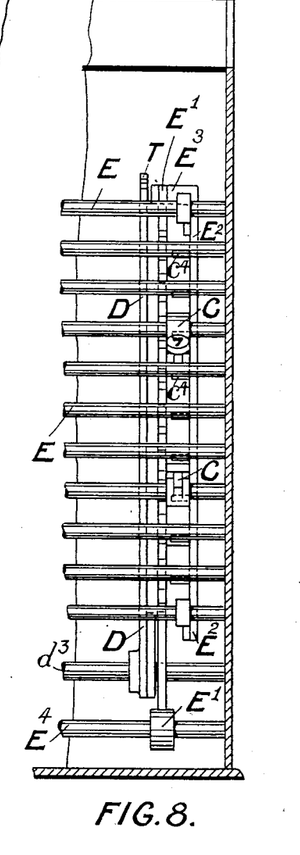
Fig. 8, front elevation of same showing lever locking rod and connections with keys removed.

The key board is arranged with each set or denomination of keys C placed vertically. The keys C are mounted on the cross shafts E one above the other and stepped or placed one a little in advance of the other for the convenience of working. Figs. 1, 2, and 7 show one denomination of keys C, the pence denomination has 11 keys C mounted alongside the others. The keys C are of the shape shown in Fig. 9 with a projection $c'$ near the back end.

Behind each set of the keys C a notched lever E' is pivoted on the shaft $E^4$, this lever is provided with two sets of notches $e'$ to $e^9$ and $e^{10}$ to $e^{18}$ which notches engage with the projections $c'$ on the keys. The set of notches $e'$ to $e^9$ engage the key that is depressed and the set $e^{10}$ to $e^{18}$ engage with all the keys that are not depressed. The lever E' is connected by a link $e$ with the operating lever D and both move forward together when a key C has been depressed. It will be seen that the notches $e'$ to $e^9$ vary in length gradually increasing in length toward the top of the lever. The length of these notches corresponds with the value of the keys and determine the movement of the lever D and consequently the lift of the counting plates A and A'. The notches $e^{10}$ to $e^{18}$ receive the projections $c'$ of the keys that have not been depressed and lock all these keys to prevent them being operated.

At the side of the lever E' a lifting bar $E^2$ is placed with a cross bar $E^3$ which engages the upper end of the lever E' and locks it and prevents any forward movement of it and of the lever D until a key has been struck and depressed. The lifting bar $E^2$ is provided with a number of projecting pins or lugs $c^4$ which rest one upon each key. The operating or depressing of any key C first raises the bar $E^2$ releasing the lever E' which falls forward with its notch over the projection $c'$ of the depressed key and with it the lever D thereby raising the cross head B and counting plate A the desired distance.

Between each set of counting plates A A' mounted upon part of the frame-work a sliding bolt 116 is fitted to slide to and fro independently of the plate (see Figs. 10 to 16). Each sliding bolt carries pivoted to it a lever 118 with a forwardly projecting pin $118^a$ and a pivoted push lever 121 which passes through a notch $a^3$ in the counting plate A'. On a cross shaft $116^a$ of the fixed frame of the sliding bolts a pin lever 117 and a locking lever 119 are pivoted, the latter passing through to a notch in the counting plate A'. Each cross head B is provided with a lateral projection $b'$ which also rests upon the sliding bolt 116, the upper surface of which is notched as shown. At or near the upper end of the counting plate A numerals 0 to 10 or to 12 may be inscribed which are exhibited through an aperture or slot or otherwise to indicate the number or amount that has been registered.

Figure 10:
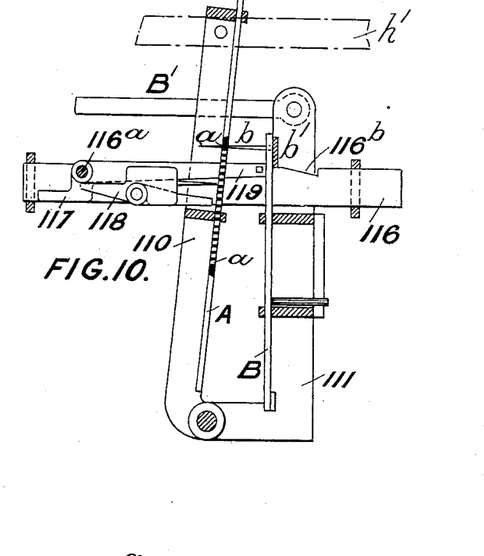
Fig. 10, side elevation enlarged of one set of counting plates.
Figure 11:
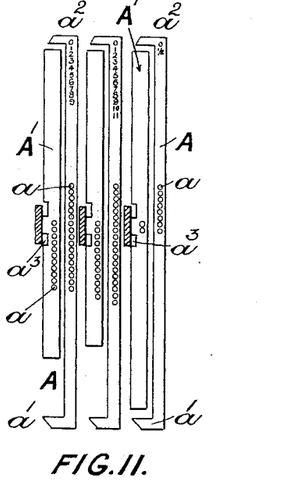
Fig. 11, front elevation of counting plates showing halfpence, pence and shilling plates.

The counting plates A and A' are in the normal position shown in Fig. 10 before the machine is operated, the zero hole $a$ of the plate A resting upon the pin $b$ of the cross head B. The striking of a key C and the operation of the lever D raises the cross head B and pin $b$ the equivalent height and with them the counting plate A. The counting plate A is provided with two lugs $a'$ $a^2$ and the supplementary counting plate A' is placed within these lugs and the bottom lug $a'$ is adjusted to engage the plate A' and lift it when a number of holes equivalent to one hole less than the dividing number of such denomination shall have been reached. That is to say in the pence when eleven holes have been raised and in decimals when nine holes have been raised and so on. The top lug $a^2$ of the plate A is always adjusted the distance of one hole $a$ above the top of subsidiary plate A'.

The sliding bolt 116 in its normal position is locked by a pin on the locking lever 119 engaging a notch on the top edge of the sliding bolt 116. On the backward stroke of the swinging frame 110 the counting plate A is carried with one of its holes $a$ onto the pin of the pivoted lever 118 before it leaves the pin of the cross head B and one of the holes of the subsidiary plate A' is carried onto the pin of lever 117 and the plates A A' are held in these relative positions while the cross head B is permitted to drop back to its zero position. During the operation of this movement the end of the push lever 121 passes through the notch in the side of the plate A' and the locking lever 119 passes through the other notch in plate A'. On the plate A being raised by the pin of the cross head B above 11 or 9 as the case may be the projecting lug $a'$ of the plate A engages the bottom of the plate A' and the two will be lifted together. The plate A' will then lift the locking lever 119 out of the notch in the top of the sliding bolt the sliding bolt being thereby left free to move and the second notch in the plate A' will be lifted above the end of the push lever 121. On the next return stroke of the swinging frame the subsidiary plate A' comes in contact with the end of the push lever 121 and carries the sliding bolt 116 along with the swinging frame 110 to the position shown in Figs. 12 and 14. The pin lever 118 will be in a position for the pin thereon to receive the plate A until the projecting lug $a'$ shall raise the plate A', but being pivoted to the sliding bolt 116 the pin 118 will be carried back free of the counting plate A and the plate will be free to fall when it leaves the end of the pin on the cross head B. The plate A then falls until the top projecting lug $a^2$ rests upon the top of the counting plate A'. The distance the plate A falls will be 12 for pence or 10 for decimals.

The projecting lug $b'$ of any one cross head B rests upon the adjacent sliding bolt 116 of the denomination lower in value. That is to say the lug $b'$ of the shillings cross head rests upon the sliding bolt of the pence, or the lug $b'$ of the tens denomination rests upon the sliding bolt 116 of the units and the hundreds on the tens and so on.

Figure 12:
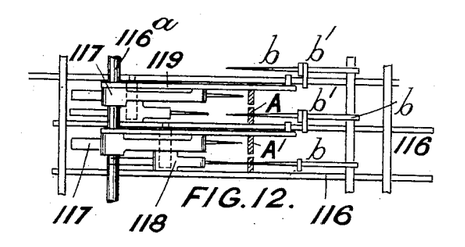
Figure 13:
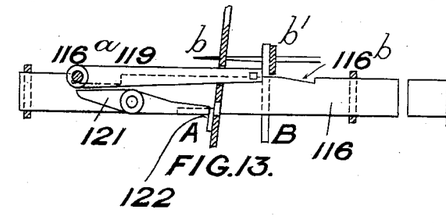
Fig. 13, side elevation in detail of sliding bolt locking lever for same and push lever.
Figure 14:
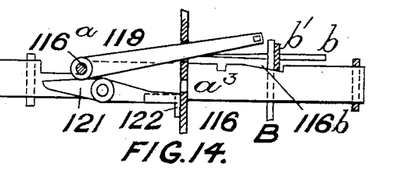
Fig. 14, side elevation of sliding bolt showing locking lever taken up by means of counting plate. Bolt is here shown as pushed back by means of the counting plate engaging with push lever. Crosshead of next denomination is shown ready to be raised by cam of sliding bolt.
Figure 15:
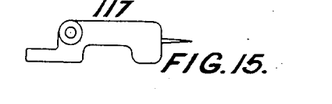
Fig. 15, fixed pin lever engaging with second counting plate.
Figure 16:
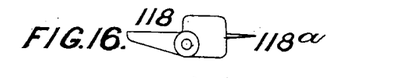
Fig. 16, movable pin lever connected to sliding bolt and moved with same.
Figure 17:
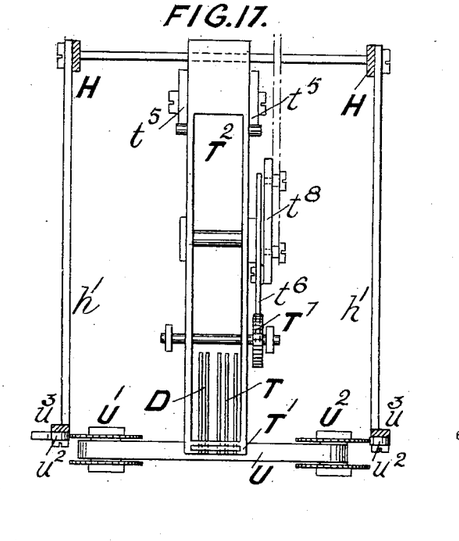
Fig. 17, plan of printing attachment.
Figure 18:
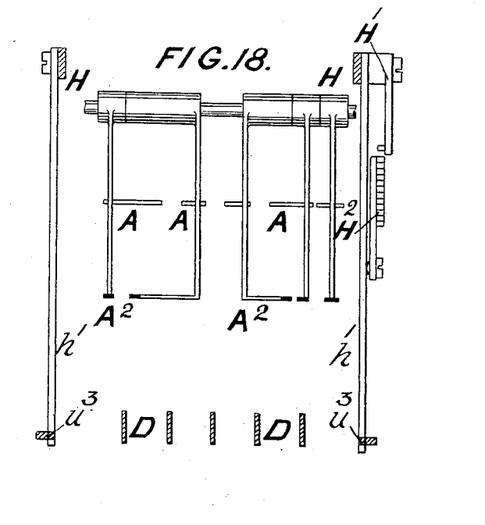
Fig. 18, plan below printing attachment.
Figure 19:
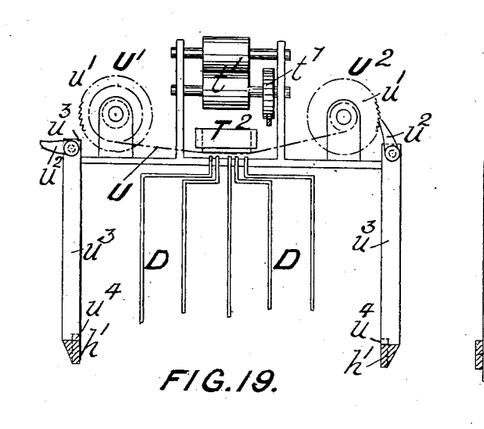
Fig. 19, front elevation of printing attachment.
Figure 20:
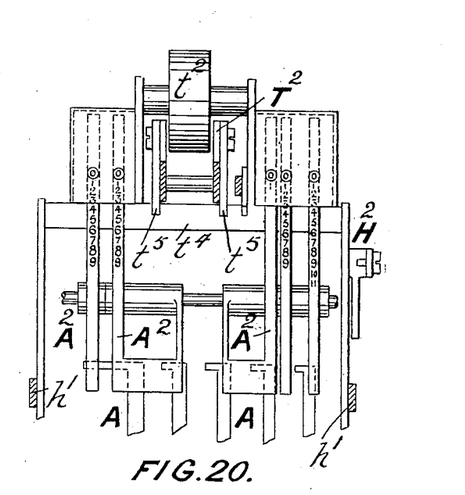
Fig. 20, sectional elevation of parts behind printing attachment on Fig. 19.
Figure 21:
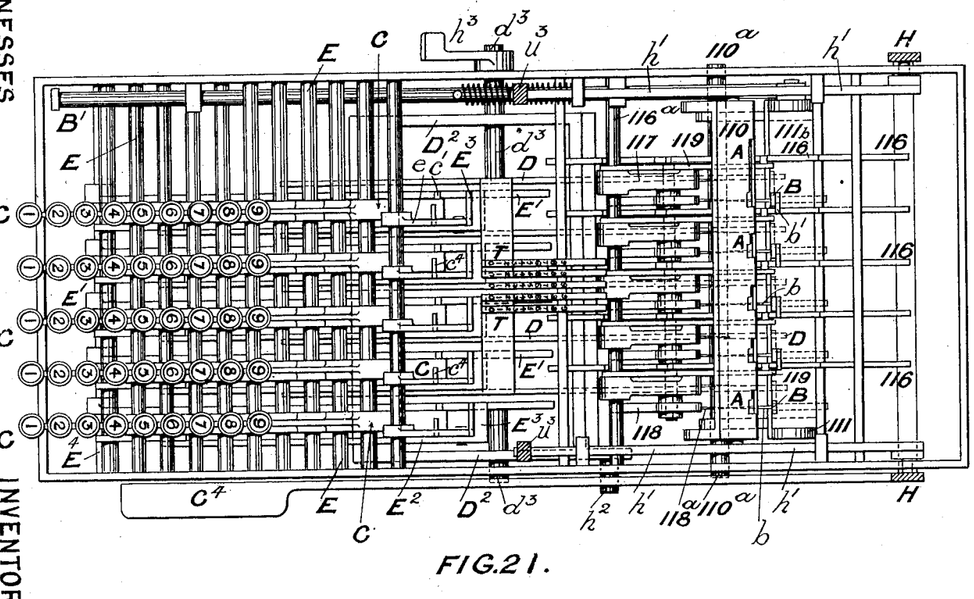
Fig. 21, plan of machine partly in section with top of frame and printing mechanism removed.

When the sliding bolt 116 is in the locked position shown in Figs. 10, 12 and 13 the projecting lug $b'$ sets the pin $b$ of the cross head B in its normal or zero position in relation to any of the keys C that have been depressed. When however the sliding bolt 116 is moved forward by the plate $A'$ into the position shown in Figs. 12, and 14, the inclined depression $116^b$, therein will permit the projecting lug $b'$ of the cross head B of the next higher value to drop or fall to the bottom of the depression $116^b$, which is equal in depth to one hole $a$ of the plate A. This therefore, permits the cross head B and pin $b$ to drop one hole below zero and consequently carries up the plate the distance of one hole higher at the next depression of the key thereby carrying one unit on from one denomination to the next. On any of the keys C being now depressed all the sliding bolts 116 which have been moved forward, are by a cross bar 122 attached to the swinging frame 110 carried back to normal position. As the sliding bolts return to position the inclined depression or cam $116^b$ raises any of the cross heads which may be below zero the distance of one of the holes $a$. This return action carries the counting plate $A'$ off the pin of lever 117, the plate drops to its zero position and the locking lever 119 falls again into the notch in the sliding bolt 116.

At zero position of the counting plate A the number of holes $a$ into which the cross head pin $b$ will enter below the top hole must be one greater than the value of the highest key, thus for pence denomination 12 holes $a$ are required and for units 10 holes $a$ are required. A similar number of holes on the plate A are required to receive the pin of the lever 118 but the holes for the pin $118^a$ may coincide with the holes $a$ or there may be sufficient extra holes as shown to accommodate both pins. In the supplementary counting plate $A'$ there are a similar number of holes to receive the pin or lever 117. The object of providing one hole more than the value of the highest key is that there shall always be a hole for the pin $b$ of the cross head B to enter. For instance if the 9 key of the shillings denomination and the 11 key of the pence denomination be both depressed, (upon a key dividing on 12 for shillings) and the 2nd key of the pence denomination be next depressed it will cause the lug $b'$ of the cross head of the shillings denomination to fall into the cam recess $116^b$ of the sliding bolt 116 of the pence denomination and the pin $b$ of the cross head B of the shillings denomination will next move into the additional hole $a$ of the plate A of the shilling denomination. After the plate A has been raised 11 holes the lug $a'$ thereof will be directly under the plate $A'$ and should any further key say 2 of the same denomination be depressed the plate $A'$ will be lifted an equivalent distance or number of holes. On the movement of the frame 110 (in the direction of the arrow) by reason of the notch $a^3$ not coinciding with the push lever 121, the sliding bolt 116 will be carried forward with it and the lug $b'$ of the cross head B of the shilling denomination will enter the cam depression $116^b$ thereby dropping the cross head B the distance of one hole.

To return all the counting plates A and $A'$ to zero after recording the totals the frame 111 and the cross heads B with it are pushed back by a push lever or link $B'$ until all the cross head pins $b$ and the plates A and $A'$ are clear of the pins or levers 118 and 117. To prevent the cross heads B falling into the cam recesses $116^b$ when this movement takes place a pin $B^2$ is fixed to the frame over each cross head B which enters a hole $b^2$ in the cross head and prevents it dropping until the frame 111 is returned to normal position.

To read the total of the amount registered at any given time the numerals on the top of the plates A are spaced the same as the holes $a$ and equivalent to the lift of the levers D and they are exposed through the apertures in a plate or cover attached to the swinging frame 110. Instead of inscribing the value of each key upon the upper end of the counting plates A the values are inscribed on a pivoted quadrant $A^2$ lying loosely on the top of the counting plate A thereby bringing the figures into a more convenient position for reading, the numerals being displayed through apertures in the frame or case. The quadrants $A^2$ are mounted so as to leave a space in the center of the machine for the paper and printing apparatus. The levers D are all carried back to zero by a resetting lever $D^2$ with a bar $D^3$ resting on the levers D. The resetting lever $D^2$ is pivoted on the rod $d^3$ and is operated by a hand lever or key in any convenient way.

At the side of the machine an operating key or lever $C^4$ is pivoted which must be depressed after each transaction of the counting keys C to operate the several parts of the mechanism. The key or lever $C^4$ is formed of bell crank shape with a member or lever H to which is pivoted the link $h'$ which is connected with and carried backward and forward with the swinging frame 110. The key or lever $C^4$ also engages a pin $h^2$ on the resetting lever $D^2$ and depresses it to reset the levers D by the bar $D^3$ striking them. The resetting lever $D^2$ may be operated by the handle $h^3$ independently of the key lever $C^4$ and without operating any other part of the machine.

For the purpose of printing and recording every transaction of the machine as operated by the keys C each lever D is provided with a quadrant upon which is mounted a type block T carrying numerals corresponding to the numerals on the keys C. Above the type block T a pressure pad T' is placed carried on a pivoted arm or lever $T^2$ so that it may be rocked down upon the type block. The pressure pad T' always moves in the same path or plane and consequently will when depressed strike whichever numeral is presented to it according to the position of the type block T on the lever D.

Around the pressure pad T' is carried a ribbon of paper $t$ which travels forward at each operation of the machine onto the roller $t'$ from the roller $t^2$. Between the pressure pad T' and the type block T a ribbon U saturated with printing ink or coated with carbon is caused to travel by which the impress of the numerals on the printing block T is imparted to the paper $t$. The depression of any key C carries the type block T into such a position that the corresponding numeral thereon is presented beneath the pressure pad T'.

The frame $T^2$ is rocked forward at each movement of the key lever $C^4$ by the bar $t^4$ of the lever H striking the trip cam $t^5$ pivoted to the frame $T^2$. The paper $t$ which receives the printed impression is wound onto the roll $t'$. On the end of the roll $t'$ a ratchet wheel $t^7$ is fitted with which a pawl $t^6$ engages. The pawl $t^6$ is carried by a sliding block $t^8$ with which the bar $t^4$ of the lever H engages at or near the end of its forward stroke.

The printing ribbon U saturated with ink or coated with carbon is carried on the rollers $U'$ $U^2$. The rollers are rotated by a ratchet wheel $u$ and pawl $u^2$. The pawl $u^2$ is carried on a sliding block or plate $u^3$ which is raised by an incline or cam surface $u^4$ on the end of the link $h'$.

On the side of the lever H a pawl H' is pivoted and to the frame is pivoted a rack $H^2$ with which the pawl H' engages. This pawl travels forward over the rack as the lever H advances and falls past the end of the rack when the lever has completed its forward stroke. The pawl H' therefore prevents the return of the lever H until it has fully completed its forward stroke.

What we claim as our invention and desire to protect by Letters Patent is—

1. Apparatus for calculating comprising in its construction a plurality of vertically sliding plates raised a given distance for each unit, a cross head with lifting pin to raise one of the sliding plates, a rocking lever to engage with and lift the crosshead, a set of keys of one denomination, each of different value, any one of which on being struck allows the rocking lever to oscillate a distance equivalent to the value of the key struck, and raise the crosshead a corresponding distance substantially as described.

2. In adding or calculating machines the combination with the sliding calculating plates, A and A', of a movable frame in which they are carried, a sliding cross head by which one is raised, and a sliding bolt, 116, moving transversely, by which the carry on from one denomination to another is effected substantially as described.

3. In apparatus for calculating the combination with a plurality of operating keys C, of rocking levers D, oscillated when a key is struck, cross heads B raised by the levers D, pins $b$ thereon, and perforated plates A with which the pins engage to raise the plates with the cross heads substantially as described.

4. In apparatus for calculating the combination with the operating keys C, of oscillating levers D oscillated when a key is struck, crossheads B raised by the levers D pins $b$ thereon, perforated plates A with which the pins engage to raise the plates, auxiliary plates A', a sliding bolt 116, and means for operating the plate A' when the plate A has been raised to the top of the lift substantially as described.

5. In calculating apparatus the combination with the operating keys C, the rocking lever D, oscillated when a key is struck, the cross head B, raised by the lever D, the pin $b$ projecting therefrom, the perforated calculating plate A the auxiliary plate A', the swinging frame 110, and the swinging frame 111, the sliding bolt 116, a lever 117 pivoted to the sliding bolt, and a projecting pin thereon which receives the plate A from the pin $b$ substantially as described.

6. In a calculating apparatus the combination with the operating keys C, the rocking lever D oscillated when a key is struck, the cross head B, raised by the lever D, the pin $b$ projecting therefrom, the perforated calculating plate A, the auxiliary plate A', the swinging frame 110, and the swinging frame 111, the sliding bolt 116, a lever 117 pivoted to the sliding bolt, and a projecting pin thereon which receives the plate A from the pin $b$, a second lever 118 with projecting pin $118^a$ pivoted to the sliding bolt, a locking lever 119, and a push lever 121, by which the sliding bolt is operated substantially as described.

7. In adding or calculating machines the combination with the operating keys C, the rocking levers D oscillated when a key is struck, the lifting crossheads B raised by the levers D and the calculating plates A A' which are raised with the crossheads B, of quadrants A² resting upon the top of the counting plates A upon which the amounts calculated are displayed, substantially as described.

8. In adding or calculating machines the combination with the operating keys C, the rocking levers D oscillated when a key is struck, the lifting crossheads B raised by the levers D and the calculating plates A A' which are raised with the crossheads B, of a type block T inscribed with numerals corresponding with those on the keys fitted upon the rocking lever D a type impression pad T' placed above the type block, a rocking frame T² to which the impression pad is attached and means for oscillating the rocking frame substantially as described.

9. In adding or calculating machines the combination with the operating keys C, the rocking levers D oscillated when a key is struck, the lifting crossheads B, raised by the levers D and the calculating plates A A' which are raised with the crossheads B, of a type block T inscribed with numerals corresponding with those on the keys fitted upon the rocking lever D, a type impression pad T' placed above the type block, a rocking frame T² to which the impression pad is attached, means for oscillating the frame, and means for traversing a ribbon of paper across the type block T substantially as described.

10. In calculating apparatus the pivoted operating keys C each provided with the projections c' of the rocking levers D oscillated when a key is struck, the pivoted lever E' provided with a plurality of notches which engage the projections c' upon the keys, and a link e by which the levers D and E are connected, substantially as described.

11. In calculating apparatus the combination with the pivoted operating keys C, each provided with a projection c', of the rocking levers D, and the pivoted lever E', connected by a link with the lever D, the lever E' being provided with a plurality of notches which engage the projections c' upon the keys substantially as described.

12. In calculating apparatus the combination with the pivoted operating keys C, each provided with a projection c', of the rocking levers D, the pivoted lever E', provided with a plurality of notches which engage the projections c', a link e connecting the levers D and E', and a lifting bar E² provided with a cross bar E³ to lock the levers E' and D until a key has been struck, substantially as described.

13. In calculating apparatus the combination with the pivoted operating keys C, each provided with a projection c', of the rocking levers D, the pivoted lever E' provided with a plurality of notches which engage the projections c', a link e connecting the levers D and E', and a lifting bar E² provided with a cross bar E³ to lock the levers E' and D until a key has been struck, the cross heads B, the calculating plates A A', the swinging frames 110, and 111, which carry the cross heads and plates, the sliding bolts 116, and the levers 117, 118, 119 and 120, pivoted upon and carried by the sliding bolts 116 substantially as described.

In witness whereof, we have hereunto signed our names in the presence of two subscribing witnesses.

BENJAMIN THOMPSON O'BRIEN,
WALTER HENRY BROWNING.

Witnesses:
 THOS. O'BRIEN,
 EDITH M. SIMS.